United States Patent [19]
Rosenberger, Jr.

[11] 3,742,863
[45] July 3, 1973

[54] TELESCOPIC TOW CHAIN
[75] Inventor: Chester A. Rosenberger, Jr., Perkasie, Pa.
[73] Assignee: FMC Corporation, San Jose, Calif.
[22] Filed: Nov. 9, 1971
[21] Appl. No.: 197,058

[52] U.S. Cl............... 104/172 BT, 74/254, 198/189
[51] Int. Cl............................................ B61b 13/00
[58] Field of Search................... 198/189, 175, 176; 74/254; 104/172 BT; 59/84, 85

[56] References Cited
UNITED STATES PATENTS
870,704  11/1907  Weston ............................... 74/254

Primary Examiner—Evon C. Blunk
Assistant Examiner—Hadd Lane
Attorney—F. W. Anderson et al.

[57] ABSTRACT

A telescopic tow chain comprising spaced apart upper and lower links joined by means of vertical pins further includes slotted connecting links. The upper links have tapered leading and trailing edges which are able to slide above or below the adjacent upper links thereby permitting the chain to compress as the vertical pins slide together in the slotted connecting links permitting the chain to drive on the return run as well as on the primary run and eliminating the necessity of a takeup mechanism.

6 Claims, 11 Drawing Figures

PATENTED JUL 3 1973 3,742,863
SHEET 1 OF 2
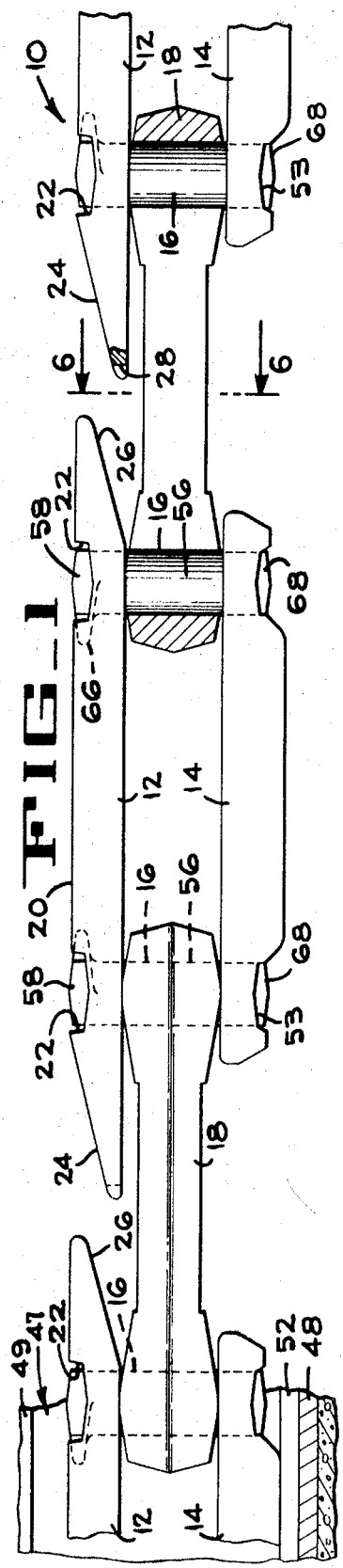
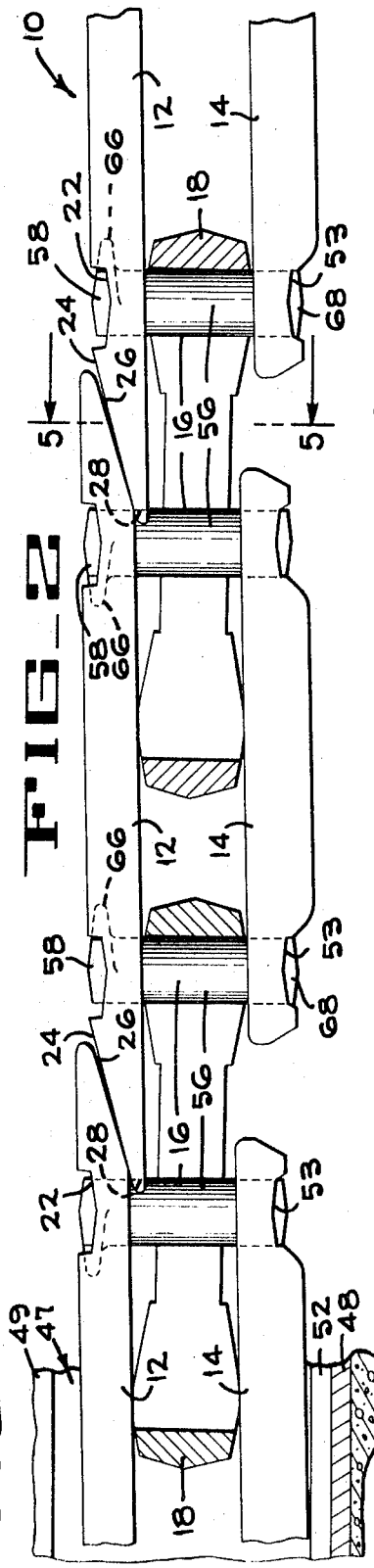
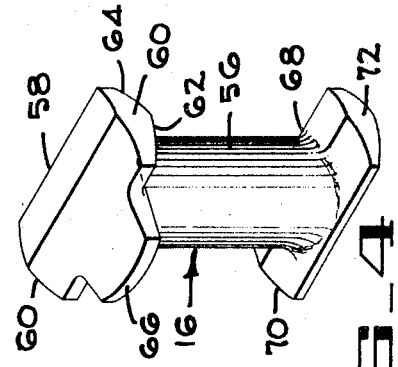
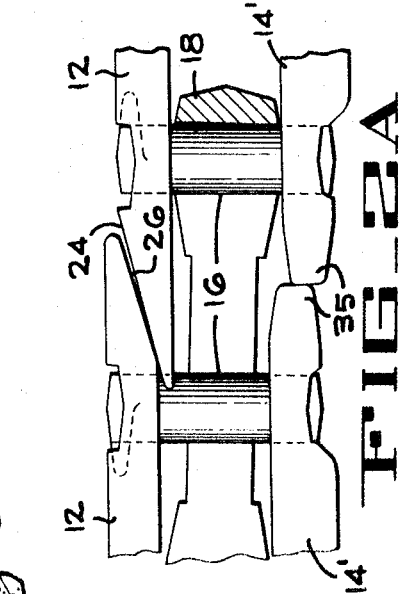
INVENTOR.
CHESTER A. ROSENBERGER, JR.
BY F.W. Anderson
C.E. Tripp
ATTORNEYS

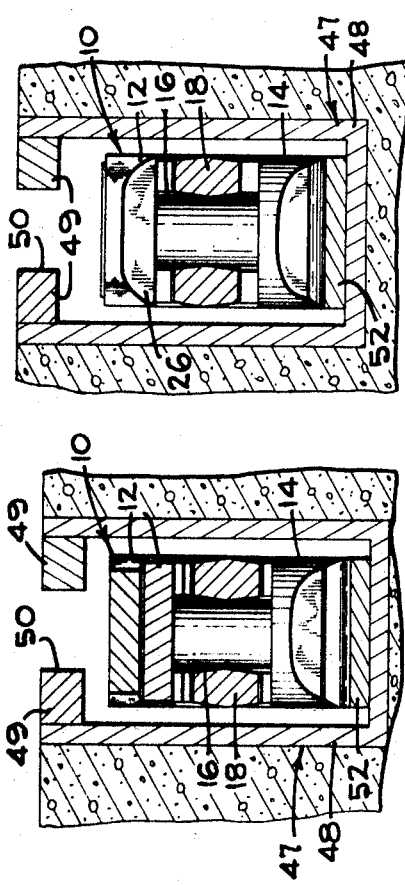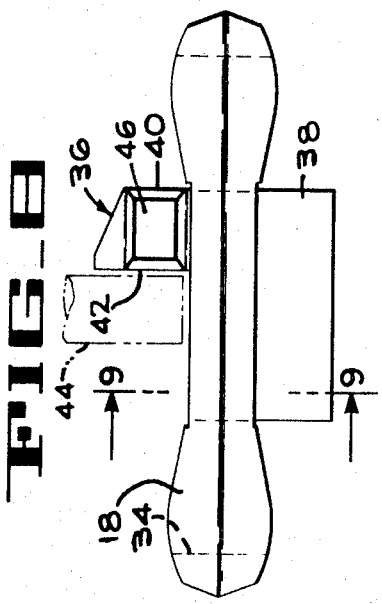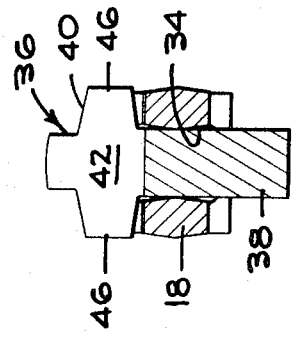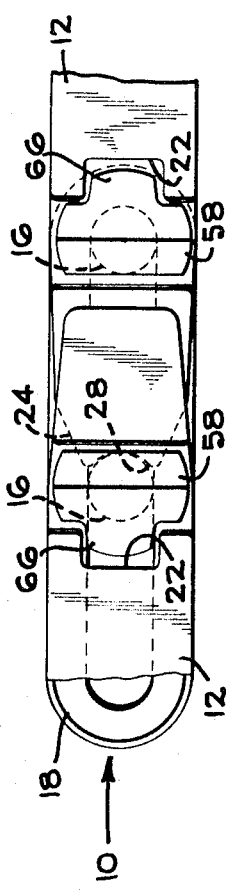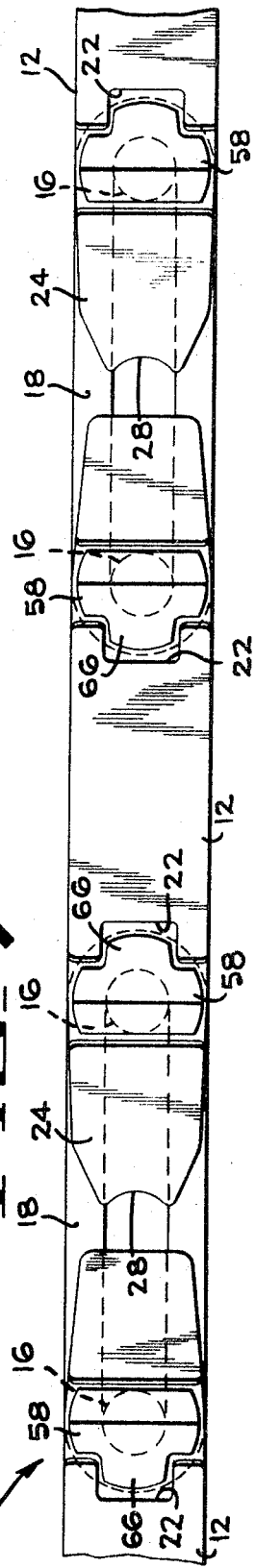

3,742,863

TELESCOPIC TOW CHAIN

BACKGROUND OF THE INVENTION

1. Field of the Invention

The present invention concerns tow chains such as employed in sub-floor conveyors and more particularly relates to a tow chain which may be telescoped.

2. Description of the Prior Art

Presently available tow chains do not provide for a significant longitudinal telescoping action. Any telescoping which can occur in chains of known design results only from the clearance provided between the links and their inner connecting pins to provide sufficient clearance and freedom for pivoting of the tow chain generally in a lateral plane. Furthermore, the tow chains of the type presently known in the art generally require take-up mechanisms in order to maintain sufficient tension in the chain for satisfactory operation and to compensate for wear between the pins and their mounting holes.

SUMMARY OF THE INVENTION

It is well known that tow chains tend to stretch under load as the chain elements wear. Since the chain is confined in a trough, the slack developed in the return run or non-tensioned side will cause the chain to jump either the drive or return sprocket. This condition is most critical when the chain and sprocket contact ratio is at a minimum. To eliminate the possibility of the chain jumping the sprocket, presently known conveyor systems generally employ tensioned idler sprockets or adjustable take-up mechanisms to maintain the desired chain tension.

It is therefore the purpose of the present invention to provide a tow chain for a sub-floor conveyor which is simple in construction and eliminates the need for idler sprockets or take-up mechanisms. The present invention achieves this purpose by providing a tow chain construction which permits a substantial telescoping action between the chain link through the use of tapered leading and trailing edges which permit these links to overlap.

Another advantage of the telescopic chain is that it is able to drive on the return run as well as the primary run without a take-up mechanism to maintain chain tension.

These and other features will become more clearly apparent from the following description.

BRIEF DESCRIPTION OF THE DRAWINGS

FIG. 1 is a side elevation of a telescoping chain of the present invention in the extended position.

FIG. 2 is a view similar to FIG. 1 which shows the chain in a telescoped position.

FIG. 2A illustrates a modified form of the lower link.

FIG. 3 is an enlarged partial plan view of one end of a lower link.

FIG. 4 is an enlarged perspective of the vertical pin.

FIG. 5 is a cross section of the chain taken on line line 5—5 of FIG. 2.

FIG. 6 is a cross section of the chain similar to FIG. 3 taken on line 6—6 of FIG. 1.

FIG. 7 is a plan view of the chain of FIG. 1.

FIG. 8 is a side elevation of the connecting link with a pusher dog installed.

FIG. 9 is a section taken on line 9—9 of FIG. 6.

FIG. 10 is a partial plan view of the chain of FIG. 2 in the telescoped position.

DESCRIPTION OF THE PREFERRED EMBODIMENT

Referring now to FIG. 1, the telescoping tow chain of the present invention is indicated generally by the reference character 10. The tow chain 10 comprises an upper link 12 and a lower link 14 joined by means of vertical pins 16. The two chain 10 further includes a connecting link 18 extending between the pairs of upper and lower links 12 and 14. As shown in FIG. 1, the chain is illustrated in the extended position wherein the upper surfaces of the upper links 12 form a generally continuous flat surface indicated at 20.

In order to prevent obstruction of this upper surface 20, the aforementioned pins 16 are received within T-shaped recesses indicated at 22 which are clearly indicated in FIGS. 7 and 10. Each of the upper links 12 further includes a downwardly inclined leading edge 24. Similarly, the lower trailing edges are inclined upwardly as indicated at 26. Additionally, the leading edge of the upper link 12 also includes a circular recess indicated at 28 shown in the broken out section in FIG. 1. This circular recess 28 is also shown in FIGS. 7 and 10 and the purpose of this recess will be discussed presently.

The lower links 14 are of a shorter length than the upper links 12, as can clearly be seen in both FIGS. 1 and 2. This provides a clearance between adjacent bottom links when the chain is telescoped as illustrated in FIG. 2.

A modified form of the lower link 14 is indicated at 14' in FIG. 2A. This modification comprises extensions 35 on the leading and trailing edges of the links 14' such that when the chain is fully telescoped, as shown, the opposing ends of extensions 35 abut. This feature prevents binding forces from being exerted on the pins 16 through unequal movement of the upper and lower links.

As the two chain is compressed from the extended position of FIG. 1 to the compressed position of FIG. 2, the trailing portion of the leading upper link 12 is cammed upwardly slightly by the engagement of the inclined trailing surface 26 with the inclined leading surface 24 of the adjacent following upper link 12 thereby permitting the following link to slide beneath the upper link 12 located immediately in front of it. When the chain is fully compressed, the curved recess 28 in the leading edge of the upper link 12 engages the vertical pin 16 as best shown in FIG. 10.

In order to prevent possible binding action between the vertical pins 16 and the upper and lower links 12 and 14 joined thereby due to compressive forces in the chain, the modified form of the lower link 14' may be employed whereby the abutment of the end surfaces of extensions 35 occurs at substantially the same point in compression as does the engagement with the curved recess 28 against the vertical pin 16. It will be apparent then that any binding action between the upper and lower links of the tow chain will be prevented by the simultaneous engagement of both the upper link with the pin 16 and the abutment of extensions 35 on the lower links 14'. This permits the chain to drive tow trucks on the return run of a loop as well as on the primary run.

Referring now to FIGS. 8 and 9, the connecting link 18 is shown in side and cross sectional views with a driving dog 36 inserted and then welded in a slot 34 formed in the link. The driving dog includes a body portion 38 with an upstanding portion 40 having a vertical pusher face 42. This pusher face engages a tow pin 44 (shown in phantom line) which depends from a tow truck to be driven by the chain as is well known in the art.

In order to maintain contact with the tow pin, the upstanding portion 40 of the driving dog further includes a pair of wings 46 that extend transversely across the connecting link 18.

The telescoping tow chain of the present invention is adapted to be received within a sub-floor channel generally indicated at 47 in FIGS. 5 and 6. The sub-floor channel 47 comprises a U-shaped member 48 of steel or the like which is generally cemented into the floor and is flush with the upper surface of the floor. The upper open portion of the channel further includes a pair of ways 49 which prevent the chain from lifting out of the channel during operation and further serve to define a slot 50 for receiving the tow pins 44 from the trucks to be driven. The channel 47 also includes a centrally located bottom way 52. FIG. 5 indicates the appearance of the chain when in the telescoped position such as shown in FIG. 2 while FIG. 6 shows the position of the the chain in section when it is in the extended position of FIG. 1.

An important advantage of the present invention is the beneficial result obtained by the telescoping action of the tow chain. This telescoping action eliminates the need for any type of idler or take-up mechanism commonly associated with sub-floor tow chain devices presently known. This results in a considerable simplification of the tow chain system in reducing the need for additional sub-floor excavation to provide room for take-up mechanisms and also eliminates the need for maintenance and adjustment of the take-up mechanisms themselves.

The manner in which the tow chain of the present invention is assembled is best explained with reference to FIGS. 2, 3, 4 and 7. As seen in FIG. 7, and as previously described, the upper links 12 include T-shaped recesses 22. Similarly, the lower links 14 include transverse recesses 53 as best seen in FIGS. 2 and 3.

In FIG. 3 it can be seen that the lower link also incorporates an elongated aperture 54 which is adapted to permit passage of the vertical pin 16 through the lower link 14 and intersects the transverse recess 53. Necessarily, the upper links 12 also include an identical elongated aperture, as shown at 54 for the lower links, that intersects the previously described T-shaped recesses 22.

Referring now to FIG. 4, the vertical pin generally indicated at 16 comprises a central shank 56 having a T-shaped head 58 on its upper portion. The T-shaped head 58 includes laterally extending wing portions 60 which include opposed bevel surfaces 62 and 64. The T-shaped head further includes a longitudinally extending projection 66, the purpose of which will be explained presently. The lower portion of the vertical pin 16 includes a transversely oriented lower head 68 comprising laterally extending wings 70 and 72 having beveled surfaces similar to those on the upper T-shaped head 58 and as indicated at 62 and 64.

To assemble the chain, the upper and lower links 12 and 14 are arranged in a position similar to FIG. 2 and are separated by means of the interconnecting link 18.

The pin is inserted through the upper link 12 with its transverse lower head oriented longitudinally. Tilting of the pin facilitates insertion. The pin then passes through the slot 34 in thP interconnecting link 18 and enters the elongated slot 54 in the lower link 14. At this time the upper and lower links 12 and 14 are slightly compressed in the vertical direction. This is permitted by the fact that the central portion of the interconnecting link 18 is somewhat narrower than the end portions. After compression of the upper and lower links, the pin 16 is rotated 90° in the appropriate direction such that the lower cross head 68 engages the transverse recess 53 in the lower link 14 and such that the upper T-shaped head 58 settles within the T-shaped recess 22 in the upper link. This completes the assembly procedure for the tow chain.

Although the best mode contemplated for carrying out the present invention has been herein shown and described, it will be apparent that modification and varation may be made without departing from what is regarded to be the subject matter of the invention.

I claim:

1. A conveyor comprising vertically spaced pairs of upper and lower links, pin means for joining said links, interconnecting links extending between said link pairs and between the spaced upper and lower links, a trough for receiving said links, a way centrally located in the bottom of said trough, a pair of restraining ways in the upper open portion of said trough, wherein the improvement comprises an elongated longitudinal slot in the interconnecting links for receiving the pin means, a downwardly inclined surface on a leading edge of the upper link, and an upwardly inclined surface on a trailing edge of the upper link, said inclined surfaces are mutually opposed so that the leading and trailing edges of adjacent upper links move into overlapping relationship when the conveyor links are subjected to longitudinally compressive forces.

2. A tow chain comprising vertically spaced pairs of upper and lower links, pin means for joining said links, interconnecting links extending between said link pairs and between the spaced upper and lower links, wherein the improvement comprises an elongated longitudinal slot in the interconnecting links for receiving the pin means, a downwardly inclined surface on a leading edge of the upper link, and an upwardly inclined surface on a trailing edge of the upper link, said inclined surfaces are mutually opposed so that the leading and trailing edges of adjacent upper links move into an overlapping relationship when said tow chain is subjected to longitudinally compressive forces.

3. The tow chain of claim 2, wherein the leading edge of the upper link further includes a recess adapted to engage said pin means when said tow chain is longitudinally compressed.

4. The tow chain of claim 2 wherein the lower links are sufficiently shorter than the upper links so that adjacent lower links do not abut when the tow chain is fully compressed.

5. The tow chain of claim 2 wherein the lower links are of such a length that adjacent lower links come into endwise abutment during chain compression at the same time that the upper link engages the pin means.

6. The tow chain of claim 2, wherein the interconnecting link is adapted to receive pusher dog means, said dog means comprising a body portion for insertion in the interconnecting link slot, transverse wing portions on the body extending transversely above and across the interconnecting link, and a pusher surface on said dog means.

* * * * *